(12) United States Patent  
Karras

(10) Patent No.: US 12,317,862 B2  
(45) Date of Patent: Jun. 3, 2025

(54) PET TREAT HOLDER AND SAFETY DEVICE

(71) Applicant: Vasiliki Karras, Granite Bay, CA (US)

(72) Inventor: Vasiliki Karras, Granite Bay, CA (US)

( * ) Notice: Subject to any disclaimer, the term of this patent is extended or adjusted under 35 U.S.C. 154(b) by 111 days.

(21) Appl. No.: 18/130,616

(22) Filed: Apr. 4, 2023

(65) Prior Publication Data

US 2023/0232787 A1 Jul. 27, 2023

Related U.S. Application Data

(63) Continuation-in-part of application No. 17/210,378, filed on Mar. 23, 2021, now Pat. No. 11,617,351, which is a continuation-in-part of application No. 16/270,698, filed on Feb. 8, 2019, now Pat. No. 11,000,014.

(60) Provisional application No. 63/473,928, filed on Jul. 8, 2022, provisional application No. 62/710,721, filed on Feb. 26, 2018.

(51) Int. Cl.  
*A01K 15/02* (2006.01)

(52) U.S. Cl.  
CPC .................. *A01K 15/026* (2013.01)

(58) Field of Classification Search  
CPC ............................ A01K 15/025; A01K 15/026  
See application file for complete search history.

(56) References Cited

U.S. PATENT DOCUMENTS

| 221,466 | A | * | 11/1879 | Klein | F16B 7/1472 403/362 |
| 780,850 | A | * | 1/1905 | Williams | F16B 7/1472 403/362 |
| 846,088 | A | * | 3/1907 | Brinley | F16D 1/0847 403/362 |
| 894,884 | A | * | 8/1908 | Hallowell | F16B 7/1472 403/362 |
| 895,408 | A | * | 8/1908 | Hallowell | F16D 1/0847 403/362 |
| 5,813,366 | A | * | 9/1998 | Mauldin, Jr. | A01K 15/025 119/710 |

(Continued)

FOREIGN PATENT DOCUMENTS

| CN | 107593496 A | * | 1/2018 | ........ A01K 15/025 |
| GB | 2598766 A | * | 3/2022 | ............ A01K 15/02 |

(Continued)

*Primary Examiner* — Joshua J Michener  
*Assistant Examiner* — Aaron M Rodziwicz

(57) ABSTRACT

A pet treat holder having a flexible outer housing with a center opening. A channel is disposed through a thickness of the flexible outer housing and radially bisects the center opening. An inner sleeve is fixed within the channel. A threaded fastener is movably disposed within the inner sleeve and adapted to be moved in a forward and reverse directions. When the threaded fastener is moved forward through the inner sleeve by twisting in a first direction, an end of the fastener secures and restricts movement of an object. The object is tightly held under compression between the fastener and the flexible outer housing. When the threaded fastener is moved in reverse through the inner sleeve by twisting in a second direction, the end of the fastener is moved away from and releases the object being tightly held under compression between the fastener and the flexible outer housing.

20 Claims, 9 Drawing Sheets

(56) References Cited

U.S. PATENT DOCUMENTS

| | | | | |
|---|---|---|---|---|
| 7,555,997 B2* | 7/2009 | Wolfe, Jr. | | A01K 15/026 |
| | | | | 119/707 |
| D658,825 S * | 5/2012 | Wolfe, Jr. | | D30/160 |
| D840,610 S * | 2/2019 | Toolan | | D30/160 |
| 10,701,899 B1* | 7/2020 | Shrestha | | A01K 15/026 |
| 10,701,900 B1* | 7/2020 | Shrestha | | A01K 15/026 |
| 11,503,806 B1* | 11/2022 | Mullin | | A46B 11/0041 |
| 11,617,351 B2* | 4/2023 | Karras | | A01K 15/025 |
| | | | | 119/707 |
| D1,010,245 S * | 1/2024 | Wolfe, Jr. | | A01K 15/026 |
| | | | | D30/160 |
| D1,029,420 S * | 5/2024 | Lewis | | D30/160 |
| 2009/0078214 A1* | 3/2009 | Mann | | A01K 15/025 |
| | | | | 119/707 |
| 2009/0217885 A1* | 9/2009 | Peter | | A01K 15/025 |
| | | | | 119/709 |
| 2012/0204809 A1* | 8/2012 | Axelrod | | A01K 15/026 |
| | | | | 119/709 |
| 2013/0074780 A1* | 3/2013 | Wechsler | | A01K 15/026 |
| | | | | 119/710 |
| 2014/0270931 A1* | 9/2014 | Jager | | A01K 15/025 |
| | | | | 403/343 |
| 2014/0345532 A1* | 11/2014 | Valle | | A01K 15/026 |
| | | | | 119/51.01 |
| 2016/0255812 A1* | 9/2016 | Wolfe, Jr. | | A01K 15/025 |
| 2017/0188546 A1* | 7/2017 | Ormsbee | | F21V 23/0492 |
| 2017/0223930 A1* | 8/2017 | Kelsay | | A01K 15/026 |
| 2018/0271062 A1* | 9/2018 | Toolan | | A01K 15/026 |
| 2019/0000040 A1* | 1/2019 | McIlvenna | | A44B 17/0029 |
| 2019/0124888 A1* | 5/2019 | Coyle | | A61N 5/0603 |
| 2019/0335714 A1* | 11/2019 | Sweetnam | | A01K 15/025 |
| 2020/0154676 A1* | 5/2020 | Walt | | A01K 15/026 |
| 2021/0212290 A1* | 7/2021 | Stern | | A01K 15/026 |
| 2022/0323830 A1* | 10/2022 | Cleghorn | | A63B 39/00 |

FOREIGN PATENT DOCUMENTS

| | | | | |
|---|---|---|---|---|
| WO | WO-2018144349 A1 * | 8/2018 | | A01K 15/026 |
| WO | WO-2021216646 A1 * | 10/2021 | | A01K 15/025 |

* cited by examiner

PET TREAT HOLDER AND SAFETY DEVICE

CROSS REFERENCE TO RELATED APPLICATIONS

This application is a Continuation-in-part Non-Provisional application, and claims priority to US Continuation in part Non-Provisional application Ser. No. 17/210,378 filed Mar. 23, 2021, U.S. Pat. No. 11,617,351 issues Apr. 4, 2023; and claims priority to U.S. Provisional Application Ser. No. 63/473,928 filed Jul. 8, 2022; and claims priority to U.S. Non-Provisional application Ser. No. 16/270,698 filed Feb. 8, 2019, now U.S. Pat. No. 11,000,014; which claims priority to U.S. Provisional Application Ser. No. 62/710,721 filed Feb. 26, 2018, the contents of all of which are hereby incorporated by reference herein in their entirety into this disclosure.

TECHNICAL FIELD

The subject disclosure relates to employing toys as treat holding devices, and in particular to providing a threaded device that can be used as a fetch toy as well as a safety device that renders chew sticks safe for dogs.

BACKGROUND

Pet treats are generally rigid in nature, such as for example: bully sticks, raw hide sticks, deer antler, and treat sticks that are bone-like. These treats are consumable by dogs and pose a health hazard when eating these treats. Dogs will chew on these treats until they can fit the entire treat in their mouth, then prematurely swallow the treat whole, the size being much larger than they are able to safely swallow. Unfortunately, this large piece swallowed can result in the dog choking and/or stomach blockage due to ingestion of a large piece of the treat stick. The emergency cost to pet owners when their dogs swallow a large piece of treat stick can be substantial.

Treat holders currently on the market are not dog friendly or safe. The massive strength of a canine's jaw can destroy conventional treat holders. Problems are exacerbated by those conventional holders because they typically are very rigid and have too many parts that the dog will bite down into various loose parts, which then become a safety hazard.

Thus, there is a need for a strong, durable treat holder that can safely withstand the strong bite of a powerful animal.

SUMMARY OF THE SUBJECT DISCLOSURE

The present subject disclosure presents a simplified summary of the subject disclosure in order to provide a basic understanding of some aspects thereof. This summary is not an extensive overview of the various embodiments of the subject disclosure. It is intended to neither identify key or critical elements of the subject disclosure nor delineate any scope thereof. The sole purpose of the subject summary is to present some concepts in a simplified form as a prelude to the more detailed description that is presented hereinafter.

While various aspects, features, or advantages of the subject disclosure are illustrated in reference to a pet treat holder, such aspects and features also can be exploited for various other animals to prevent choking.

To the accomplishment of the foregoing and related ends, the subject disclosure, then, comprises the features hereinafter fully described. The following description and the annexed drawings set forth in detail certain illustrative aspects of one or more embodiments of the disclosure. However, these aspects are indicative of but a few of the various ways in which the principles of the subject disclosure may be employed. Other aspects, advantages and novel features of the subject disclosure will become apparent from the following detailed description of various example embodiments of the subject disclosure when considered in conjunction with the drawings.

In one exemplary embodiment, the present subject disclosure is a pet treat holder having a flexible outer housing with a center opening. A channel is disposed through a thickness of the flexible outer housing and radially bisects the center opening. An inner sleeve is fixed within the channel. A threaded fastener is movably disposed within the inner sleeve and adapted to be moved in a forward and revers directions. When the threaded fastener is moved forward through the inner sleeve by twisting in a first direction, an end of the fastener secures and restricts movement of an object. The object is tightly held under compression between the fastener and the flexible outer housing. When the threaded fastener is moved in reverse through the inner sleeve by twisting in a second direction, the end of the fastener is moved away from and releases the object being tightly held under compression between the fastener and the flexible outer housing.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION

Figure 1:
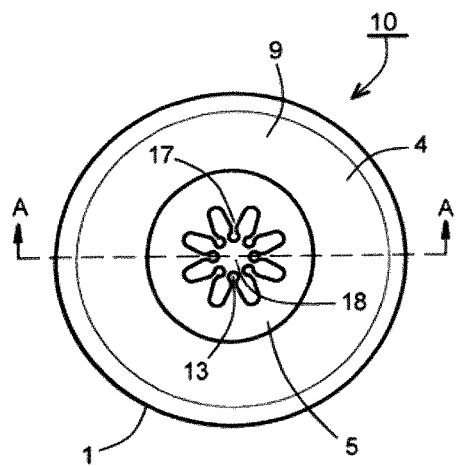
FIG. 1 illustrates a front view of the pet treat holder according to this subject disclosure.

Particular embodiments of this subject disclosure will now be described in greater detail with reference to the figures.

The subject disclosure is described with reference to the drawings, wherein like reference numerals are used to refer to like elements throughout. In the following description, for purposes of explanation, numerous specific details are set forth in order to provide a thorough understanding of the present disclosure. It may be evident, however, that the present disclosure may be practiced without these specific details.

Various exemplary embodiments of the subject disclosure are presented throughout the figures. Multiple perspective views of a pet treat holder according to an exemplary embodiment of the present subject disclosure are presented in various embodiments.

Figure 2:
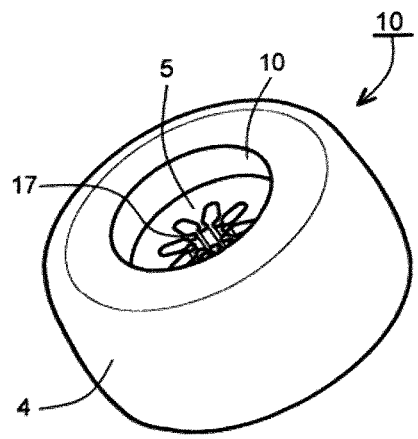
FIG. 2 is a top perspective view of the pet treat holder.
Figure 8:
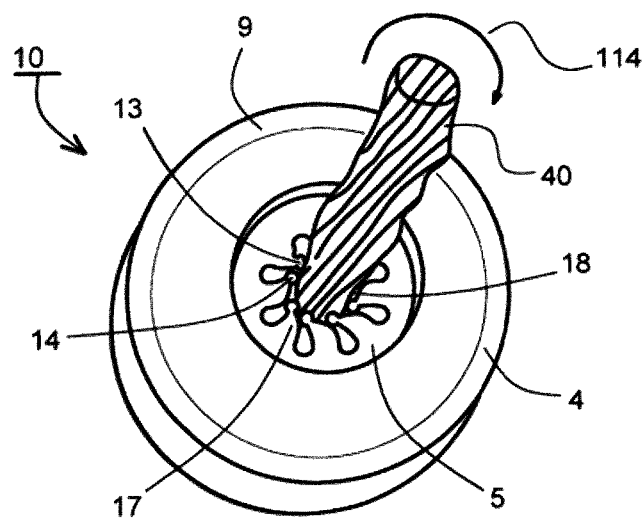
FIG. 8 illustrates a front perspective view of the pet treat holder with a treat inserted.
Figure 9:
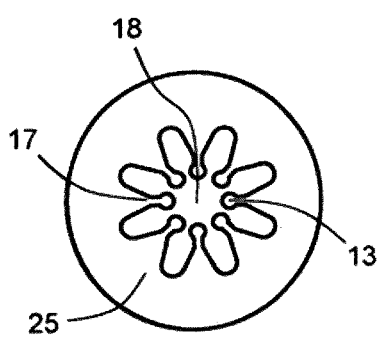
FIG. 9 is a front view of the center insert at rest.

FIGS. 1-2 and 8 show a pet treat holder 10 according to the present subject disclosure. The holder 10 has an outer housing 4 and a center portion 5. Various advantages are embodied by the construction of the holder 10. That is, in addition to rigid or semi rigid straight stick-shaped treats, the holder 10 can be attached to many different shapes of treats, such as curved, spiral, other obtuse shapes due to its flexible center portion 5. The holder 10 itself is constructed as a chew toy that will provide the pet lasting enjoyable entertainment.

The holder 10 can be made of a single integral or unitary part. That is, the outer housing 4 and the center portion 5 are constructed as a single unitary construction. The holder 10 may be mold injected as a single part as shown in perspective cross section view in FIGS. 11-16. Pet owners will benefit from the holder 10 construction by being able to keep their pets safe while consuming chew sticks that have been known to cause a hazard when ingested by dogs.

Alternatively, the holder may be made of two or more parts such as shown in the holder 100 in FIGS. 3-7. The various pieces of the multipiece holder 100 is connected to each other by a variety of methods, such as by co-molding, over-molding, fusing and/or any other suitable process for connecting two or more parts to form a single integral or unitary part. As a two-piece holder 100, the holder 100 may include an outer housing 4 having a center insert 25. When molded together during manufacturing, the holder 100 is adapted for use with dog treats of various shapes from semi-rigid, straight, curved, spiral or other shape dog treats according to this subject disclosure.

The holders the holder 10, 100, 200, 300, 400, 500, 600, 700, 800 may be made of various non-toxic materials, such as a rubber, an flexible elastomer, natural rubbers, styrene-butadiene block copolymers, polyisoprene, polybutadiene, ethylene propylene rubber, ethylene propylene diene rubber, silicone elastomers, fluor elastomers, polyurethane elastomers, nitrile rubbers and/or any other suitable material that is very durable and having high-density qualities capable of taking strong pressure from a bite from a large canine. The material selected may also be made of a non-toxic material having a material strength that can securely hold a pet treat within the holder 10 without being a hazard to the pet itself. Pet owners benefit in keeping their dogs safe while consuming a chew sticks that has previously been known to cause a choking hazard when prematurely ingested by dogs.

As shown in the figures, the holder 10, 100, 200, 300, 400, 500, 600, 700, 800 may take a variety of different shapes and/or sizes. The outer housing 4 may be round, circular such as a toroid, square, rectangular, triangular, made to resemble a particular object, such as a bone, a flower, a mouse and/or any other suitable shape according to this subject disclosure.

The center portion 5 may also take a variety of different shapes and/or sizes. The center portion 5 may be also round, square, rectangular, triangular, made to resemble a particular object and/or any other suitable shape according to this subject disclosure.

The outer housing 4 may be made from a stronger and harder material then the center portion 5. For example, the outer housing 4 can be composed of a more durable rubber, or other flexible material, having a higher durometer. The center portion 5 may be made of a flexible material having a lower durometer.

Figure 3:
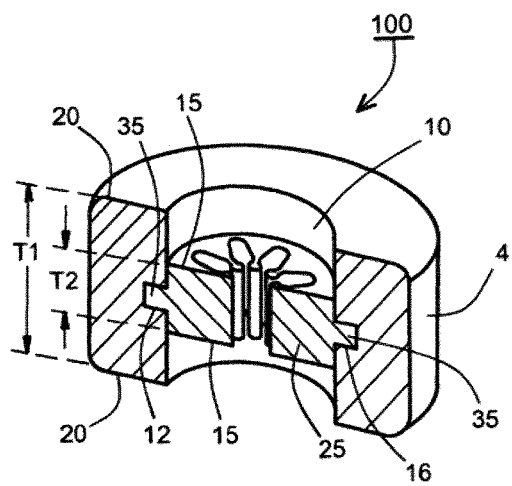
FIG. 3 is a perspective cross section view at A-A in FIG. 1 of the pet treat holder.
Figure 4:
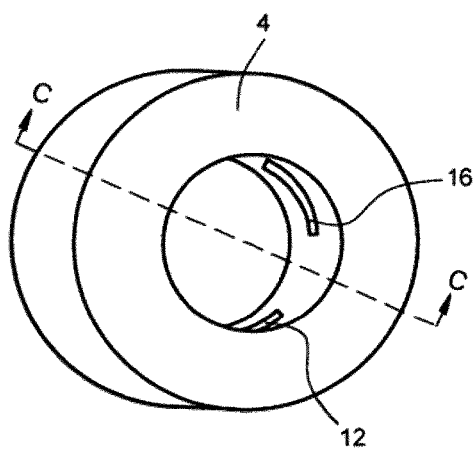
FIG. 4 is a front perspective view of the outer housing.

FIG. 3 shows an embodiment in which the holder 100 is a two-part construction. In particular, the center insert 25 is shown recessed or countersunk inward of a first thickness (T1) of the outer housing 4 so that outer surfaces 15 of the center insert 25 are recessed and not flush with outer surfaces 20 of the outer housing 4. A second thickness (T2) of the center insert 25 is thinner than a first thickness (T1) of the outer housing 4. The outer surfaces 15 of the second thickness (T2) of the center insert 25 may be placed at a predetermined countersunk depth 10 below a highest point on the outer surfaces 20 of the outer housing 4 so that a pet cannot easily reach the center insert 25 that is holding the object 40 with a sufficient strong rotational counterforce that is clamping the object in place. The center insert 25 is a solid, durable and flexible portion.

Figure 5:
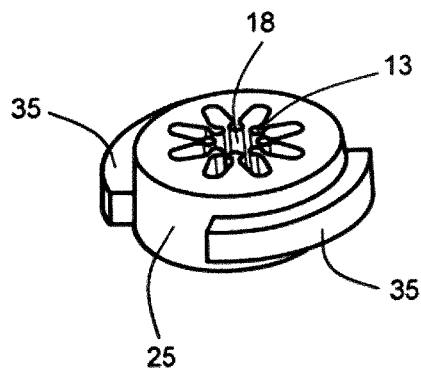
FIG. 5 is a top perspective view of the center insert.
Figure 6:
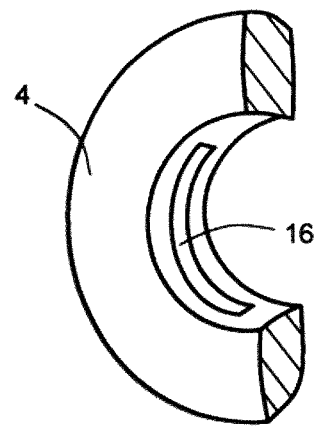
FIG. 6 is a front perspective cross section view at B-B in FIG. 4 of the outer housing.
Figure 7:
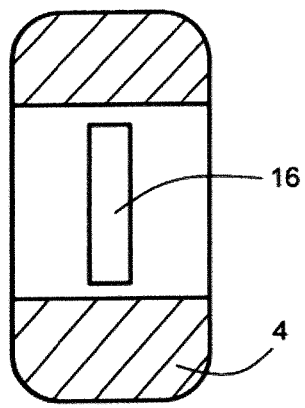
FIG. 7 is a side cross section view at B-B in FIG. 4 of the outer housing.

FIGS. 3-7 illustrate the holder 100 being constructed as a two-piece holder 100 in which the center insert 25 is disposed in the outer housing 4 during manufacturing. In FIGS. 3 and 5, the center insert 25 is shown having tabs 35 disposed thereon. The tabs 35 may be manufactured with the center insert in a single mold. Alternatively, the tabs 35 may be integrated as part of the center insert 25 in a variety of different ways, such as over-molded, bonded or any other suitable process during the manufacturing process. In assembly of the holder 100, the tabs 35 are inserted into inner circular openings 12, 16 (FIG. 4) of the outer housing 4. Although shown as two tabs 35, it is possible to have one or many tabs.

FIGS. 1, 3, 5 and 8-9 show the center insert 25 having a plurality of solid projections 17 centrally located. The projections 17 point radially inwards towards a centermost opening 18. Each of the projections 17 narrows or tapers inward toward the centermost opening 18. Each of the projections 17 has an enlarged end 13 at its outermost, radially inward end. Although described as a centermost opening, it is to be understood that the opening 18 may be positioned offset from the center according to this subject disclosure.

Figure 14:
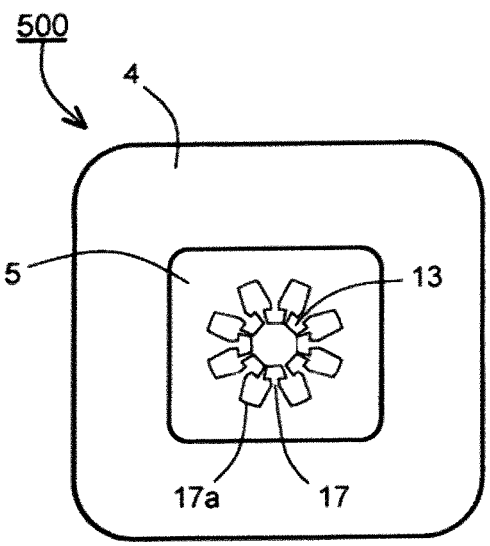
FIG. 14 is a front view of a single piece construction of the pet treat holder according to a fifth embodiment of the subject disclosure.

FIGS. 1 and 14 show that the enlarged ends 13 may take a variety of different sizes and/or shapes. For example, the proximal or radially inward enlarged ends can be round, beaded, square, diamond and/or any shape suitable to grip an object 40 inserted into the centermost opening 18. The mass of the enlarged ends 13 is wider than the radially inward tip of the projections 17. Furthermore, the enlarged ends 13 are adapted to increase a grip strength or rotational counterforce that secures the projections 17 around an object 40 as the object 40 is wedged into and twisted into the centermost opening 18 such as shown in FIG. 8.

Figure 10:
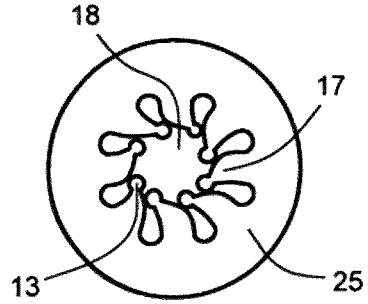
FIG. 10 is a front view of the center insert in a twisted configuration.

FIG. 8 shows the holder 10 in use. A solid object 40, such as a chew stick, can be inserted and securely held inside of the centermost opening 18. With the application of repeated twisting and wedging the object 40 into the centermost opening 18, a pushing torque is input by the pet owner pushing the object into the opening 18. The aggressive twisting action of the object 40 into the opening 18 of the holder 10 is similar to screwing a lag bolt into a solid material. With increased force and torque, the object 40 travels further through the holder 10 and locks into the holder 10 more securely. Through the rotational forces of compression and friction caused by twisting, the tips or enlarged ends 13 of the projections 17 deflect to one side 14, as shown in FIGS. 8 and 10. These increased internal forces are caused by the harder outer housing 4 compressing counterforces harder inward against the object 40 with the projections 17 and enlarged ends 13 as the object 40 increases in diameter within the centermost opening 18 as it is being twisted into the centermost opening 18. The friction forces caused by the enlarged ends 13 of the projections 17 are also increased as the enlarged ends 13 are deflected to one side by the twisted insertion of the object 40 entering. A resultant counterforce is produced that prevents the object 40 from being untwisted and rotationally removed from the holder 10.

As shown in FIG. 8, the enlarged ends 13 of the projections 17 close around the object 40 inserted in the direction of the applied twisted torque 114, creating a strong bond that resists separation and prevent the pet from pulling the object 40 out from within the holder 10. The strong bond can be released when the user applies a reverse twisting motion to overcome the counterforces and eventually remove the object 40 from the holder 10.

Figure 11:
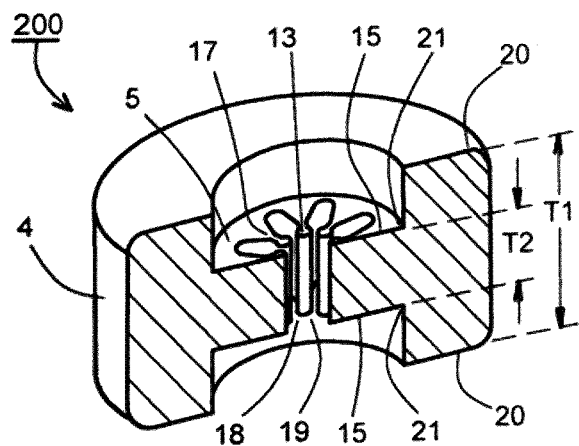
FIG. 11 is a perspective cross section view of a single piece construction of the pet treat holder according to another embodiment of the subject disclosure.

FIG. 11 shows another single piece holder 200 embodiment which is made of a single integral or unitary part. As shown, an outer perimeter shape or outer housing 4, and an inner perimeter shape or center portion 5 are composed of a single unitary construction. As shown, the inner perimeter shape of the center portion 5 has a second thickness (T2) between its outer recessed surfaces 15. The outer perimeter shape of the outer housing 4 has a first thickness (T1) between its outer surfaces 20. The inner perimeter shape of the center portion 5 is disposed within the outer perimeter shape. The second thickness (T2) is thinner than the first thickness (T1) and is countersunk into the first thickness (T1) defining shoulders 21. The inner perimeter shape of the center portion 5 has an opening 18 with a central aperture 19 located therein. As mentioned previously, although described as a centermost opening, the opening 18 may be positioned offset from the center according to this subject disclosure. The opening 18 extends through the second thickness (T2). The opening has a plurality of flexible projections 17 extending toward the central aperture 19. Each of the flexible projections 17 terminates in an enlarged tip 13. The countersunk inner recessed surfaces 15 of the center portion 5 make it more difficult for an animal to reach into the center portion 5 and dislodge an object 40 secured therein.

Similarly, and as shown in FIGS. 8 and 10, the flexible projections 17 and the enlarged tips 13 are configured to restrict removal of an object 40 when the object 40 is twisted in a first direction through the opening 18. Likewise, the flexible projections 17 and the enlarged tips 13 will release the object 40 when a sufficient force is applied to overcome a counterforce securing the object in position. When the sufficient force is applied, the object 40 is twisted in a second direction, opposite the first direction to release the object 40 from the holder 10.

Figure 12:
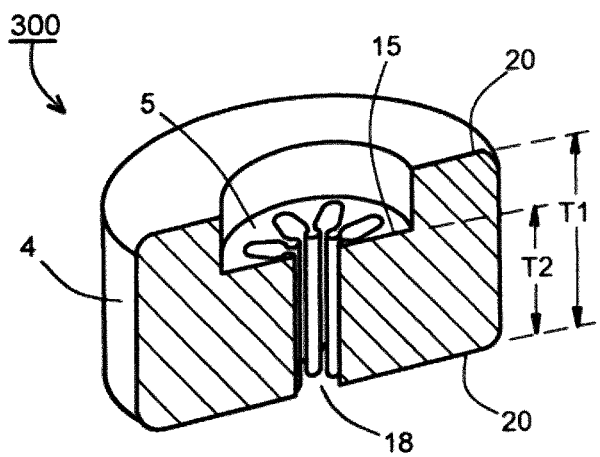
FIG. 12 is a perspective cross section view of a single piece construction of the pet treat holder according to a third embodiment of the subject disclosure.

FIG. 12 shows yet another holder 300 embodiment which is made of a single integral or unitary part. As shown, the entire holder 300, that is, the outer perimeter shape or outer housing 4, and the inner perimeter shape or center portion 5 are made of a single unitary construction. A second thickness (T2) of the inner perimeter shape of the center portion 5 is thinner than the outer perimeter shape of the first thickness (T1) of the outer housing 4. However, the lower outer surface 20 of the thickness (T2) for the lower end of the center portion 5 also shares the same surface with the outer surface 20 of the outer housing 4. However, the upper surface 15 of the center portion is countersunk below the upper outer surfaces 20 of the outer housing 4. This construction also makes it difficult for the pet to easily reach the center portion 5 when the object 40 is placed within the opening 18 and allowed to extend outward from the recessed surface 15 of the center portion 5 as also shown in FIG. 8.

Figure 13:
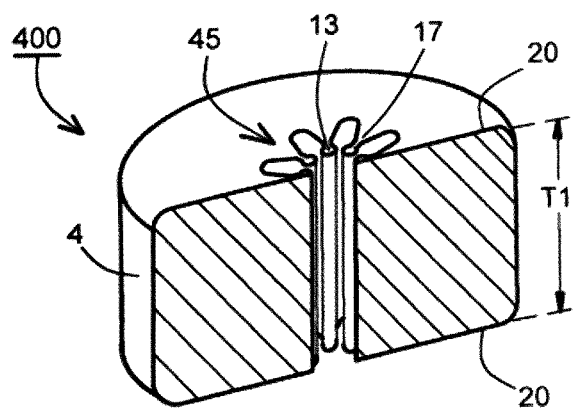
FIG. 13 is a perspective cross section view of a single piece construction of the pet treat holder according to a fourth embodiment of the subject disclosure.

FIG. 13 shows yet another holder 400 embodiment which is made of a single integral or unitary part. As shown, the entire holder 400, that is, the outer perimeter shape or outer housing 4 is inclusive of what was previously defined as the inner perimeter shape or center portion. That is, the outer housing 4 and the central portion 45 are now one and the same thickness (T1) defined between surfaces 20 and constructed as a single unitary holder 400. The holder 400 is configured as only a single thickness (T1) with a center portion 45 that includes the projections 17 and enlarged ends 13.

Figure 15:
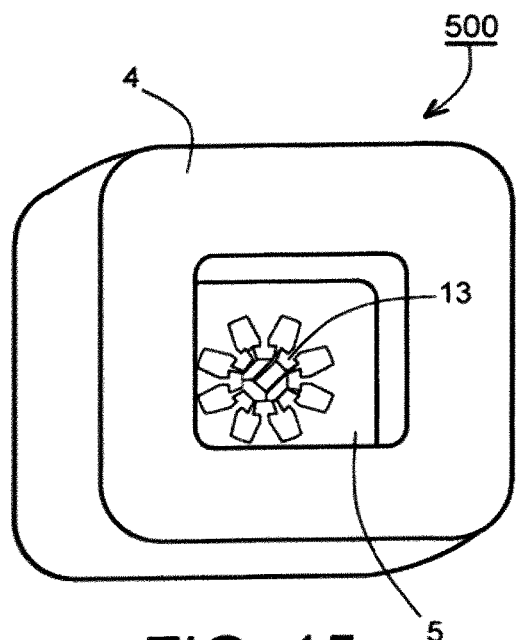
FIG. 15 is a front perspective view of the single piece construction for the pet treat holder according to the fifth embodiment of the subject disclosure.

FIGS. 14-15 illustrate another holder 500 embodiment which may be made of a single integral or unitary part. Alternatively, the holder 500 may be made of various parts and attached into a single integral or unitary part. The outer perimeter shape of the outer housing 4 is square or rectangular shaped and the inner perimeter shape or center portion 5 is also illustrated rectangular in shape.

The projections 17 and the enlarged ends 13 have a shape different from the shape of the projections 17 and the enlarged ends 13 shown in FIG. 1. For example, the outmost ends 17a of the opening defining the projections 17 are flattened, and the enlarged ends 13 are a box-like shape. Likewise, the housing 4 and the center portion 5 of the holder 400 are similar to a square shape. As mentioned above, any suitable shape is possible.

Figure 16:
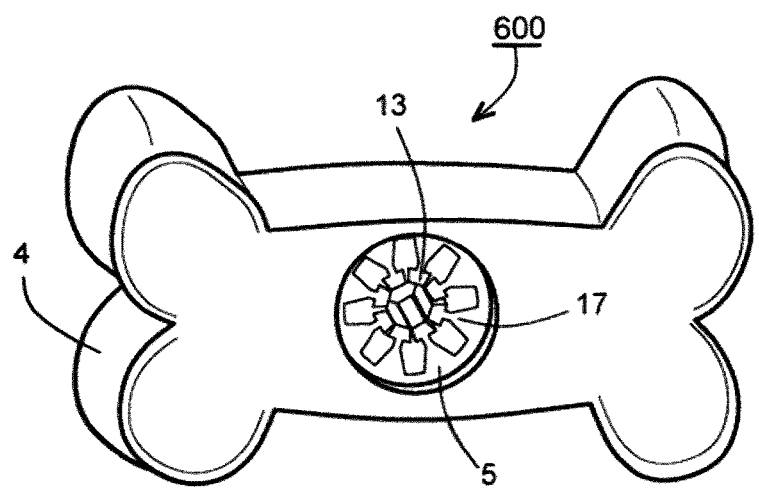
FIG. 16 is a front perspective view of a single piece construction of the pet treat holder according to a sixth embodiment of the subject disclosure.

FIG. 16 shows another holder 600 embodiment which may be made of multiple or a single integral or unitary part.

As shown, the outer perimeter shape of the outer housing 4 is an obscure shape constructed as a bone. The inner perimeter shape or center portion 5 is circular in shape. The center portion 5, the projections 17 and enlarged ends 13 are also countersunk into the outer perimeter shape of the outer housing 4. As mentioned, the holders may be constructed in any suitable shape according to this disclosure.

Figure 17:
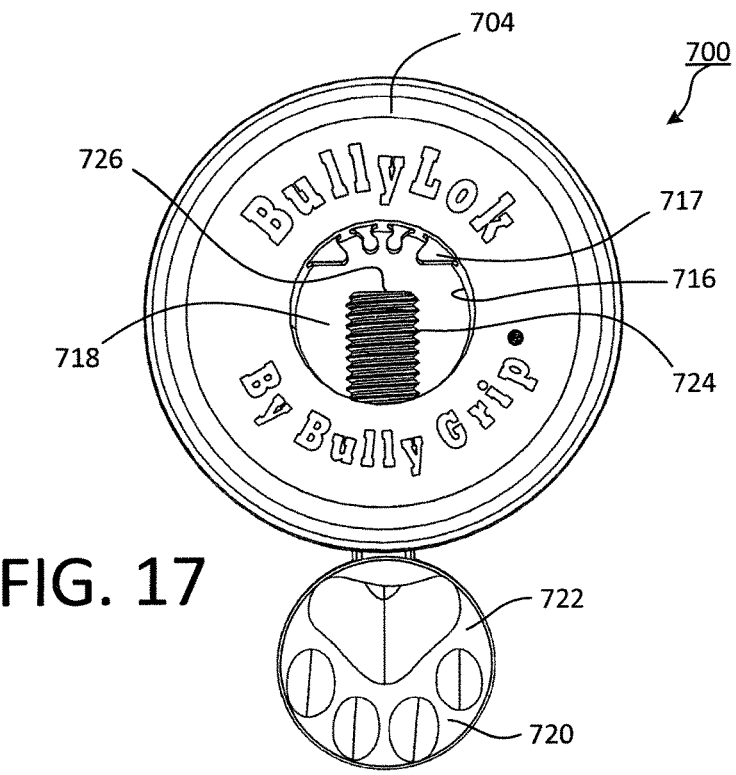
FIG. 17 is a front view of a pet treat holder according to a seventh embodiment of the subject disclosure.
Figure 18:
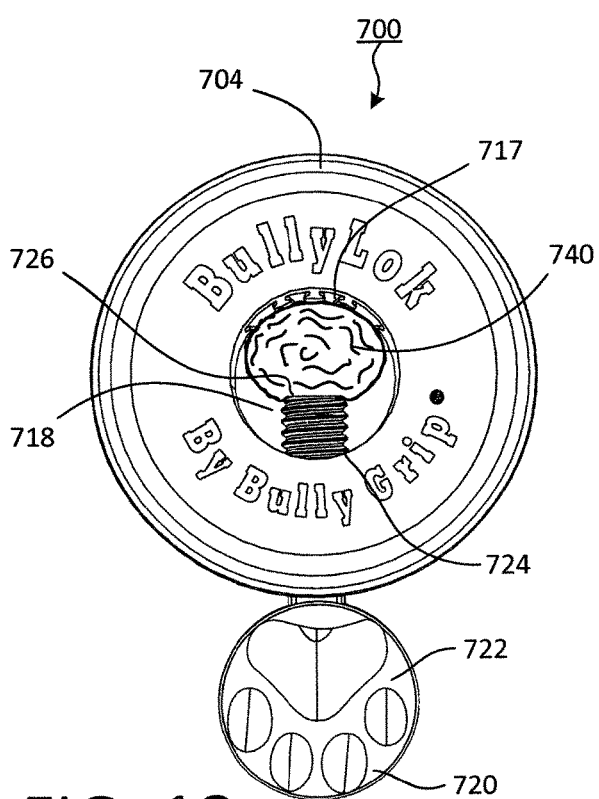
FIG. 18 is a front view of the pet treat holder having a pet treat disposed therein.
Figure 19:
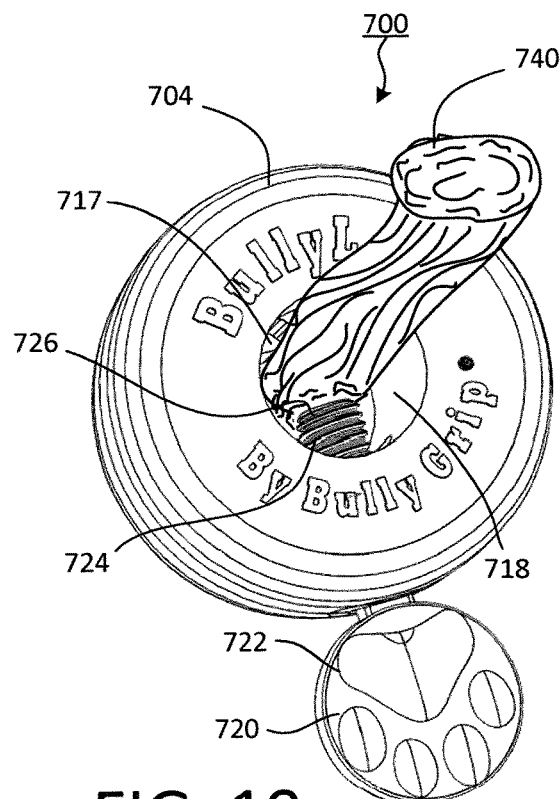
FIG. 19 is a front perspective view of the pet treat holder having a pet treat disposed therein.

FIGS. 17-19 show another exemplary pet treat holder 700 that secures a rigid pet treat 740 in place so that an animal cannot swallow the pet treat 740 prematurely causing a health choke hazard to the animal according to the present subject disclosure. The holder 700 and later described holder 800 possess all of the pertinent qualities of the previous holders 10, 100, 200, 300, 400, 500, 600 described above according to this subject disclosure.

As shown in FIGS. 17-19, the holder 700 has an outer housing 704 and a center opening 718 having an interior surface 716. In the center opening 718, various projections 717 extend from the interior surface 716 inward within the center opening 718. A fastener 720 is provided through the outer housing 704 to move toward and away from the projections 717 in order to trap and secure a pet treat 740 within the center opening 718.

Figure 20:
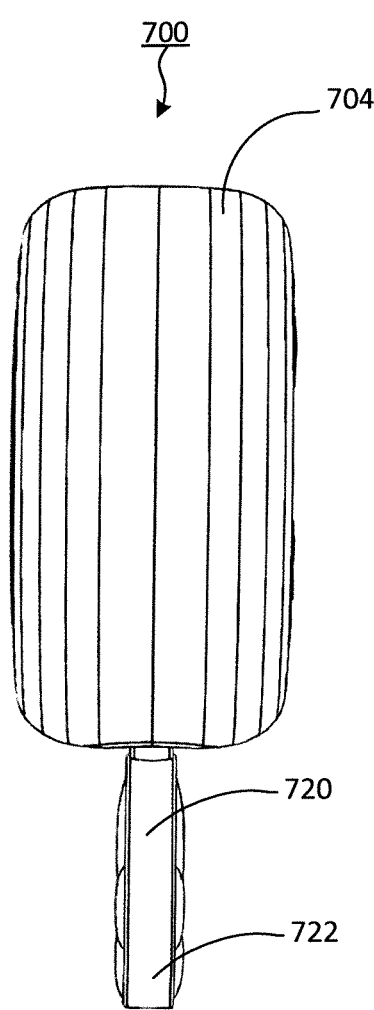
FIG. 20 is a side view of the pet treat holder in accordance with the subject disclosure.
Figure 21:
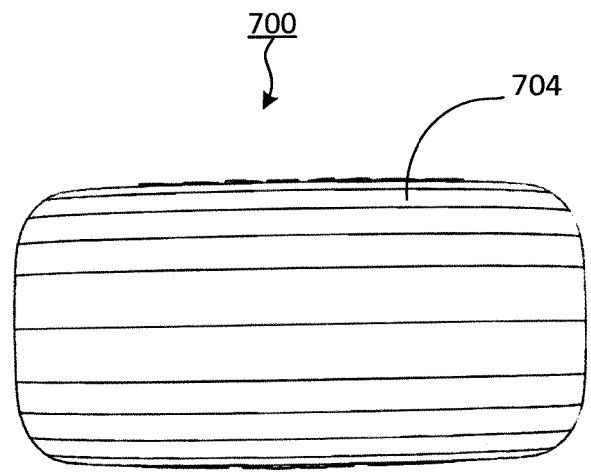
FIG. 21 is a top view of the pet treat holder in accordance with the subject disclosure.
Figure 22:
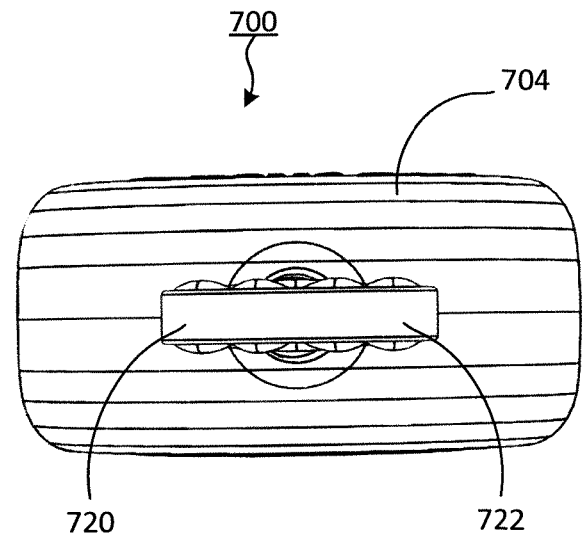
FIG. 22 is a bottom view of the pet treat holder in accordance with the subject disclosure.

FIGS. 20-22 illustrate side, top and lower views of the holder 700. In FIG. 20, the fastener 720 is shown in a recessed position within the outer housing 704. FIG. 21 shows a top view of the outer housing 704 of the holder 700. FIG. 22 illustrates a bottom view of the fastener 720 recessed within the outer housing 704. As mentioned previously, it is to be understood that the outer housing 704 may be composed of a variety of different shapes and sizes. For example, the outer housing 704 may include, but is not limited to various shapes, such as: round, square, rectangular, oblong or any other shape according to this subject disclosure. As shown herein, the outer housing 704 has taken a circular or toroid shape.

Figure 26:
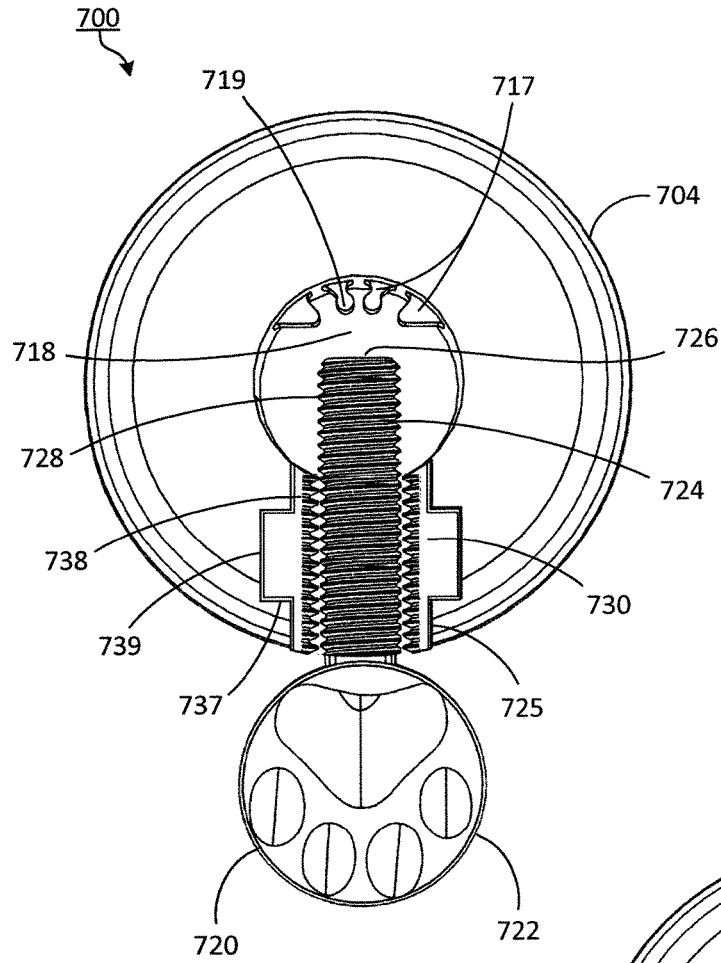
FIG. 26 shows a partial cut-away view through an outer housing and an internal sleeve of the pet treat holder according to a seventh embodiment of the subject disclosure.

Referring to FIG. 17, when the external shape is circular, the outer housing 704 may be approximately 4 inches in an outer diameter, and 1-2 inches in an inner diameter. The thickness of the circular outer housing 704 would then be approximately 1 inch. As shown in FIG. 20, a width of the outer housing 704 may be constructed at approximately 1⅝ inch. As shown in FIG. 26, an approximate thickness for the screw 725 may be approximately ¾ inch, and the threaded length of the screw 725 may be selected to be approximately 2½ inches. Although exemplary dimensions are provided above, it is to be understood the holder may be any suitable size larger or smaller in accordance with this subject disclosure.

The outer housing 704 may be composed of a variety of suitable materials, such as a strong, albeit pliable or flexible material not easily torn. The material being suitable to withstand the strong bite of a canine or other animal capable of biting very hard, while not damaging the animals' teeth, such as by cracking them. Unlike other conventional pet treat toys, the outer housing 704 according to this subject disclosure is pliable and is adapted to prevent causing damage to other objects and surfaces, such as tile, wood floors, etc. when the holder 700 is dropped.

Figure 23:
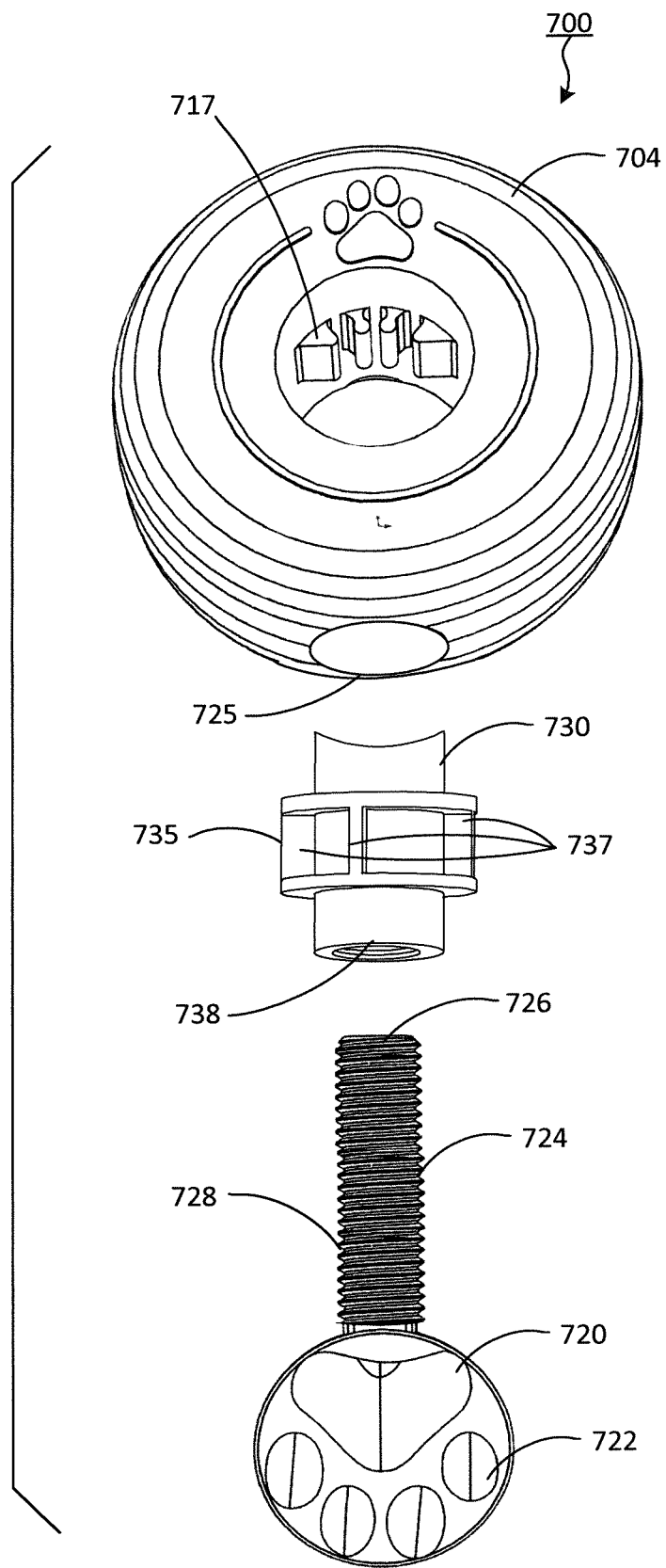
FIG. 23 is an exploded view of the pet treat holder.

FIG. 23 depicts an exploded view of the holder 700. An internal sleeve 730 is shown removed from its secure position within a channel 725 disposed within the outer housing 704 (see also FIG. 26 for a partial cross section view of the holder 700). The fastener 720 is also shown removed from the internal sleeve 730 and the outer housing 704. The fastener 720 is embodied as a screw 724 connected to a handle 722.

Like the outer housing 704 of the holder, the handle 722 of the fastener 720 that is connected to the outer housing 704 may be made of a strong resilient material capable of receiving a bite with sufficient force from a large animal and not causing damage to the animal's teeth. That is, the handle 722 may be made of a similar solid material that is strong, albeit pliable or flexible and not easily torn and can withstand the intense pressure applied by an animal biting down hard on the handle 722.

Figure 24:
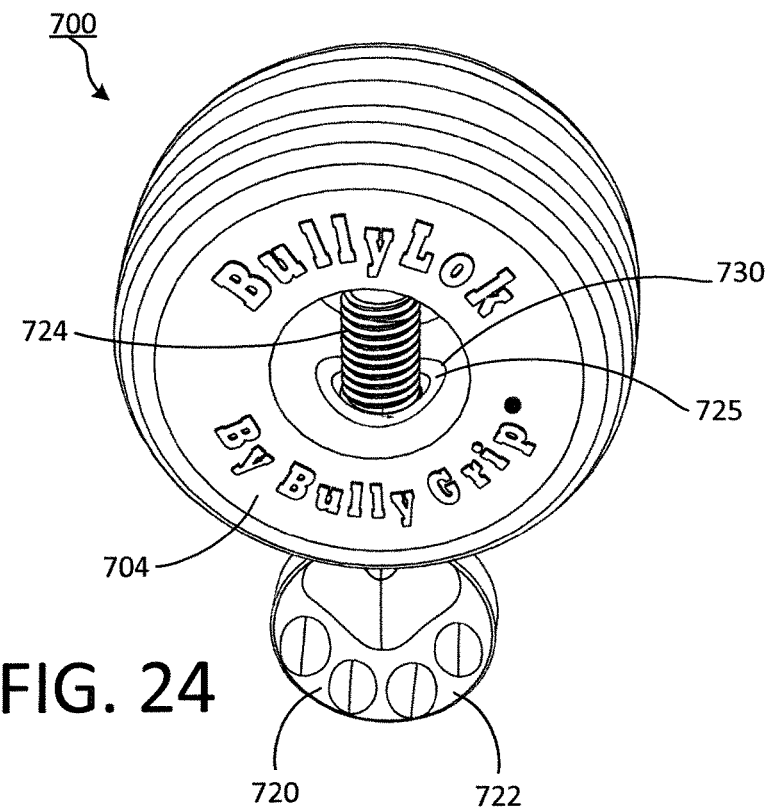
FIG. 24 is an upper perspective view of the pet treat holder.
Figure 25:
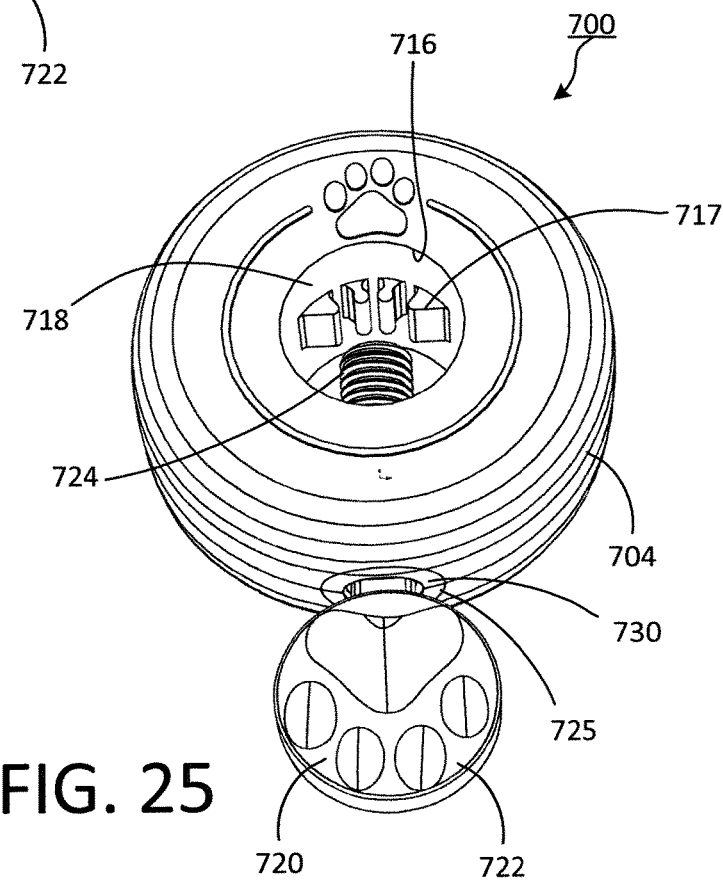
FIG. 25 is a lower perspective view of the pet treat holder.

FIGS. 24, 25 and 26 further illustrate the position of the internal sleeve 730 within the outer housing 704 of the holder 700. As shown, the internal sleeve 730 is disposed within a channel 739 disposed in the outer housing 704 between the center opening 718 and an external surface of the outer housing 704.

FIG. 24 depicts an upper perspective view of the holder 700 showing the placement of the internal sleeve 730 secured within the channel 725 hollowed out in the outer housing 704. The screw 724 is also shown threaded into the internal sleeve 730.

According to this subject disclosure, the internal sleeve 730 may be secured within the channel 725 in a variety of different ways, such as by gluing, bonding, injection molding of the flexible outer housing 704 around the internal sleeve 730, by providing mating ribs and recesses to secure the internal sleeve 730 to the channel 725 within the outer housing 704 of the holder 700.

Figure 27:
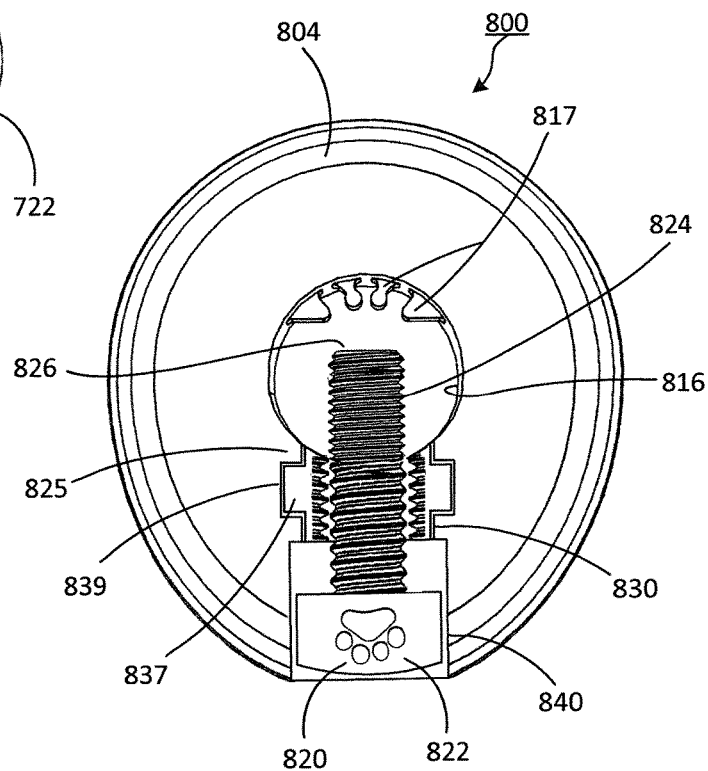
FIG. 27 is a partial cut-away view through an outer housing and an internal sleeve of the pet treat holder according to an eight embodiment of the subject disclosure.

For example, in FIGS. 23, 26 and 27, the internal sleeve 730 has a middle portion 735 having various weblike tab extensions 737, 837 that are fixed along a length of an outer surface of the internal sleeve 730, 830. The tab extensions 737, 837 are adapted to mate with and fit inside of corresponding recessed notches 739, 839 within the channel 725 disposed within the outer housing 704, 804 to lock the inner sleeve 730, 830 in place within the outer housing 704, 804. It is to be understood that a variety of different methods for securing the internal sleeves 730, 830 to the channel 725, 825 are possible and are contemplated by this subject disclosure. As mentioned previously, the outer housings 704, 804 may be made by a mold injection process. The internal sleeves 730, 830 are aligned within a rubber mold and a rubber material is injection molded into the mold to form the rubber outer housing around the internal sleeve 730 and around the weblike tab extensions 737, 837 to form a secure hold on the internal sleeve 730. During the injection process, rubber is injected in and around the webs in the middle section of the internal sleeve to tightly lock in the internal sleeve 730 within the outer housing 704.

FIG. 25 shows a lower perspective view of the holder 700 illustrating the secure placement of the internal sleeve 730 within the channel 725 formed within the outer housing 704. The screw 724 is also depicted threaded into the internal sleeve 730 toward a direction of the projections 717. It is to be understood that the projections 717 on the inner surface 716 of the center opening 718 may be removed since the screw 724 may compress the pet treat 740 directly against the internal surface 716 of the center opening 718 of the outer housing 704. Since the outer housing 704 is flexible, when the screw 724 is tightened against the outer housing 704, the pet treat 740 can be compressed tightly into the outer housing 704 in a manner that would slightly deform the outer housing 704 to conform to the shape of the pet treat 740 thereby gripping the pet treat 740 in a more secure manner. However, when the projections 717 are present and the screw 724 is compressing the pet treat 740 against the projections 717, since the projections 717 are also flexible, the projections 717 will deform and conform to the shape of the pet treat 740 thereby providing a greater surface are capable of gripping the pet treat 740 to secure it and lock it in place.

FIG. 26 shows a partial cut-away view through the outer housing 704 and the internal sleeve 725 of the holder 700. For ease of review, the external threads 728 on the screw 724 are shown minimally spaced away from the internal threads 738 on the inside of the internal sleeve 725. In operation, the mating threads 728, 738 would be much closer so that they would engage and operate in a normal fashion to tighten against each other to tighten the end 726 of the screw 724 against an object located in the center opening 718.

As shown in FIGS. 23 and 26-27, the internal sleeves 730 and 830 are shown in a cylindrical shape and are provided within the channels 725, 825 disposed within the outer housings 704. 804. The fastener 720 is secured by the internal sleeve 730. In particular, the screw 724 has been threadedly screwed into the internal sleeve 730 by a twisting action of the handle 722 by a user. As the handle is twisted in a first closing direction, an end 726 of the screw 724 is moved forward towards the projections 717 to lock in a treat 740 between the screw 724 and the projections 717.

The internal sleeves 730, 830 are made from a rigid material sufficiently strong enough to provide mating threads 738 that withstand the sufficiently strong forces applied to the threads 728 of the screw 724 which are disposed and secured within the internal sleeves 730, 830. The rigid material may include, but is not limited to, nylon, plastic, metal or any other suitable rigid material to hold the screw tightly within the internal sleeves 730, 830. It is to be understood that the screw 724 and its threads 728 may also be made of the same rigid material that the internal sleeves 730, 830 are composed of. In the instance where the internal sleeves 730, 830 and the screws 724, 824 are made of two different material, one flexible and one more rigid, a tightening advantage is provided to secure the pet treat 740 with a sufficiently strong hold. For example, when the screw 724 is made of a more flexible material and the internal sleeve 730 is of a more rigid material, the flexible material of the screw 724 will bend or wrap around the pet treat 740, and the projections 717 with the enlarged ends 719 will grip the pet treat 740 tighter not enabling the canine to remove the pet treat 740, thereby preventing a potential choke hazard to the animal where an otherwise unsecured pet treat 740 was not secured tightly. It is also to be understood that a head of the screw 724 may be overlaid or covered by a flexible material so that the rigid screw head is not accessible to the animal.

Projections 717 having enlarged tips 719 are shown extending inward from the inner surface 716 into an interior of the center opening 718 from an upper portion of the outer housing 704. As described before in the previous embodiment shown in FIG. 8 and mentioned above, the projections 717 and the enlarged tips 719 are made of a flexible material adapted to grip the rigid pet treat 740 (see FIGS. 18-19). As shown in FIGS. 18 and 19, when a pet treat 740 is placed in the center opening 718, the end 726 of the outer threads 728 of the screw 724 are threadedly fastened against the inner threads 728 738 on the internal sleeve 730 by turning the handle 720 to advance the end 726 upward into the center opening 718 toward the projections 717. As the handle 722 is continually turned, the end 726 of the screw 724 presses into the pet treat 740 locking it in place so that it cannot be removed when a large animal, such as a large canine, bites and pulls at the pet treat 740 with a sufficiently strong force.

FIG. 27 shows another exemplary embodiment for a holder 800. FIG. 27 shows a partial cut-away view through the outer housing 804 and the internal sleeve 825 of the holder 800. The outer housing having an oblong shape to account for the storage of the handle 722 within the outer housing 804. As shown, the handle 822 of the fastener 820 is able to be counter-sunk or screwed into a recess 840 provided in the outer housing 804. The handle 822 sits within the recess 840 eliminating or reducing the handle 822 from being obstructed with or interfered with during use. In this recessed position, the animal will not be able to bite the handle 722. The internal sleeve 830 is shorter and provided within the channel 825 within the outer housing 804. The fastener 820 is secured into the internal sleeve 830. In particular, the screw 824 may also be shorter and can be screwed into the internal sleeve 830 by a twisting action of the handle 822 by a user. As the handle 822 is twisted in a first closing direction, an end 826 of the screw 824 is moved forward towards the projections 817 to lock in a treat 740 between the screw 824 and the projections 817.

Various advantages are embodied by the construction of the holders 10, 100, 200, 300, 400, 500, 600, 700, 800. That is, in addition to rigid or semi rigid straight stick-shaped treats, the holders 10, 100, 200, 300, 400, 500, 600, 700, 800 can be attached to many different shapes of treats, such as curved, spiral, other obtuse shapes due to its flexible outer housing as well as flexible protrusions disposed in the center opening. The holders 10, 100, 200, 300, 400, 500, 600, 700, 800 themselves are constructed as a chew-toys that will provide the pet lasting enjoyable entertainment.

As employed in this specification and annexed drawings, the term "or" is intended to mean an inclusive "or" rather than an exclusive "or." Moreover, articles "a" and "an" as used in the subject specification and annexed drawings should generally be construed to mean "one or more" unless specified otherwise or clear from context to be directed to a singular form.

What has been described above includes examples that provide advantages of the subject disclosure. It is, of course, not possible to describe every conceivable combination of components or methodologies for purposes of describing the subject disclosure, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The illustrations and examples provided herein are for explanatory purposes and are not intended to limit the scope of the appended claims. It will be recognized by those skilled in the art that changes or modifications may be made to the above-described embodiment without departing from the broad inventive concepts of the subject disclosure. It is understood therefore that the subject disclosure is not limited to the particular embodiments which is described, but is intended to cover all modifications and changes within the scope and spirit of the subject disclosure.

What is claimed:

1. A pet treat holding device, comprising:
   a flexible outer housing that is bendable having a center opening and a channel that radially bisects the center opening;
   an inner sleeve fixed within the channel disposed within the flexible outer housing; and
   a fastener movably disposed within the inner sleeve adapted to move:

in a first direction forward through the inner sleeve so that an end of the fastener secures an object by compressing down and tightly holding the object between the fastener and the flexible outer housing that flexes around the object under compression; and in a second direction reverse through the inner sleeve so that the end of the fastener releases the object being tightly held under compression between the fastener and the flexible outer housing.

2. The pet treat holding device recited in claim 1, wherein the fastener further comprises a handle attached to a threaded screw.

3. The pet treat holding device recited in claim 1, wherein tabs are formed on an outer surface of the inner sleeve that mate with and lock into recessed notches disposed into a wall of the channel.

4. The pet treat holding device recited in claim 1, wherein an interior surface of the center opening has various flexible projections extending inward within the center opening, and wherein at least one some of the flexible projections terminate in an enlarged tip.

5. The pet treat holding device recited in claim 4, wherein the flexible projections taper inward as they extend toward the central opening.

6. The pet treat holding device recited in claim 4, wherein when the fastener is moved in the first direction in which a compression force is applied, the flexible projections and the enlarged tips are flexible and bent around the object to conform to the shape of the object being trapped.

7. The pet treat holding device recited in claim 4, wherein the enlarged tip of each of the flexible projections is a bead-shaped tip.

8. The pet treat holding device recited in claim 1, wherein the outer housing is a toroid shape.

9. The pet treat holding device recited in claim 1, wherein the material of the flexible outer housing is rubber.

10. A pet treat holding device, comprising:
a flexible outer housing that is bendable having a center opening and a channel that radially bisects the center opening, an interior surface of the center opening has various flexible projections extending inward of the center opening;
an inner sleeve is disposed within the flexible outer housing fixed within the channel; and
a threaded fastener is movably disposed within the inner sleeve and adapted to move:
forward through the inner sleeve by twisting in a first direction so that an end of the threaded fastener secures and restricts movement of an object by compressing down and tightly holding the object between the threaded fastener and the flexible outer housing that flexes around the object under compression; and
reverse through the inner sleeve by twisting in a second direction so that the end of the threaded fastener moves away from and releases the object being tightly held under compression between the threaded fastener and the flexible outer housing.

11. The pet treat holding device recited in claim 10, wherein the threaded fastener further comprises a handle attached to a threaded screw.

12. The pet treat holding device recited in claim 10, wherein tabs are formed on an outer surface of the inner sleeve that mate with and lock into recessed notches disposed in the channel.

13. The pet treat holding device recited in claim 10, wherein the flexible projections extend inward into the interior surface of the center opening, are located opposite the end of the threaded fastener, and wherein at least one of the flexible projections terminate in an enlarged tip.

14. The pet treat holding device recited in claim 10, wherein when the threaded fastener is moved in the first direction in which a compression force is applied by the end of the threaded fastener, at least one of the flexible projections has a and the enlarged tips that is flexible and bent around the object to conform to a shape of the object being trapped.

15. The pet treat holding device recited in claim 10, wherein the flexible projections taper inward as they extend toward the central opening, and the enlarged tips of the flexible projections is a bead-shaped tip.

16. The pet treat holding device recited in claim 10, wherein the outer housing is a rubber toroid shape.

17. A pet treat holding device, comprising:
a flexible outer housing that is bendable having a center opening and a channel that radially bisects the center opening, an interior surface of the center opening has various flexible projections extending inward of the center opening;
an inner sleeve is disposed within the flexible outer housing fixed within the channel, the inner sleeve having tabs formed on an outer surface of the inner sleeve that mate with and lock into recessed notches disposed within the channel; and
a threaded fastener movably disposed within the inner sleeve, opposite the flexible projections, and adapted to be moved:
forward through the inner sleeve by twisting in a first direction so that an end of the threaded fastener secures and restricts movement of an object by compressing down and tightly holding the object between the threaded fastener and the flexible outer housing that flexes around the object under compression; and
reverse through the inner sleeve by twisting in a second direction so that the end of the threaded fastener moves away from and releases the object being tightly held under compression between the threaded fastener and the flexible outer housing.

18. The pet treat holding device recited in claim 17, wherein the threaded fastener further comprises a handle attached to a threaded screw.

19. The pet treat holding device recited in claim 17, wherein when the threaded fastener is moved in the first direction in which a compression force is applied by an end of the threaded fastener, wherein at least one of the flexible projections has an enlarged tips that is flexible and bent around the object to conform to the shape of the object being trapped.

20. The pet treat holding device recited in claim 17, wherein the flexible projections taper inward as they extend toward the central opening, and enlarged tips of the flexible projections is a bead-shaped tip.

* * * * *